United States Patent Office 3,438,855
Patented Apr. 15, 1969

3,438,855
PURIFYING RADIOACTIVE ISOTOPES
Joseph J. Fitzgerald, Winchester, Mass., assignor to Sanders Nuclear Corporation, Nashua, N.H., a corporation of Delaware
No Drawing. Filed Dec. 2, 1966, Ser. No. 598,638
Int. Cl. G21g 5/00
U.S. Cl. 176—16                                    6 Claims

ABSTRACT OF THE DISCLOSURE

The present invention relates to the economic production of thulium 170 and thulium 171 radioactive isotopes. The method comprises obtaining substantially pure thulium 170 and thulium 171 by first combining thulium 169 with a carrier to form a target material of a stable thulium 169 compound. The compound is irradiated to form thulmium 170 in the compound with the resultant recoil energy breaking the bond between the thulium 170 and its attached carrier. The thulium 170 can be easily separated from the target material and recombined with a carrier to form a second stable compound with bonded thulium 170. The second compound is then irradiated to again cause the recoil energy to separate the thulium 171 formed and allow final separation of the substantially pure thulium 171 from the target material. The method can be used to separate various isotopes other than those of thulium.

---

There has been an increasing demand for radioactive heat sources for energy purpose which are included in such devices as thermionic, thermoelectric generators, isotopic power conversion cycles and radio isotopic powered medical devices such as prosthetic heart pumps. Sources of Sr-90, Cm-244, Po 210 and Pm 147 have commonly been used or considered. However, there has been no significant usage or consideration of thulium isotopes, i.e., thulium 170 and thulium 171, at least partly because economical methods of separating thulium 170 and thulium 171 from a starting target of thulium 169 and from each other have been difficult to devise. In order to produce high purity thulium 171, it had been thought that high flux levels and long irradiations of target thulium 169 would be desirable and necessary to produce thulium 170 which subsequently absorbs a neutron to produce thulium 171. When such a process is used, continous decay of the thulium 170 during irradiation extends the activation time period necessary adding to production cost or production cost is increased because of the time required for thulium 170 to decay to low levels. Separation of the nonactivated target material is extremely difficult. Such separation may be desirable in order to increase the power density of resultant thulium 171.

An economical method of obtaining substantially pure thulium isotopes has now been found. The method comprises purifying thulium isotopes by first chemically combining thulium 169 with a carrier to produce a stable thulium compound. The thulium 169 compound is used as a target in a nuclear reactor and irradiated for a period of time at a neutron flux level high enough to form thulium 170 in the compound, which thulium 170 has a recoil energy after irradiation high enough to break the bond between the thulium 170 and the carrier and thereby free the thulium 170. The thulium 170 can be recombined with a second stable carrier to form a second stable compound and the irradiation process repeated. Thus, thulium 171 is produced in the reactor with a recoil energy from a second captured neutron, great enough to break the bond between the thulium 171 and the carrier. The resulting free thulium 171 can then easily be separated from the target material by known physical separation procedures. By the process of this invention, either thulium 170 or thulium 171 can be produced economically at high purity levels.

In its broadest aspect, the invention comprises a method of purifying a radioactive isotope of a material, such as a rare earth metal, which can be neutron activated to a first radioactive isotope which in turn can be neutron activated to form a second isotope. The material is combined with an organic carrier to form a first stable organic compound. The compound is irradiated preferably in a neutron reactor to form the first isotope and recoil energy in the compound after irradiation is permitted to free the first isotope by breaking its bond with the compound. The first isotope is then recombined with an organic carrier and the irradiation process repeated to form a free second isotope which can be separated from the reaction mixture and products remaining after irradiation.

The thulium carrier used in this invention can be any material which will chemically combine with thulium to form a stable compound which as a result of neutron capture in the thulium, will break the bond between the thulium isotope produced and the carrier. Carrier compounds should preferably be composed of materials which have low neutron absorption cross sections so that parasitic absorption of neutrons and unwanted disruption of chemical bonds will be minimized. Organic compounds comprised of hydrogen, oxygen, nitrogen and carbon for instance are appropriate.

Such carriers for thulium 169, thulium 170 or other isotopes include 2,2,6,6-tetramethyl-3,5-heptanedione, 8-hydroxyquinoline, pthalocyanine complexes, lanthanum derivatives and montmorillonite clays.

The starting target material of a thulium 169 compound can be formed by chemical combination with the carrier materials to form the compounds or complexes by known chemical techniques. For example, a thulium complex of thulium 169 and 2,2,6,6-tetramethyl-3,5-heptanedione can be formed.

After the first stable compound of thulium is formed, the target material is placed in a conventional isotopic nuclear reactor which may be for example a power reactor or an isotope production reactor and irradiated preferably at neutron flux levels of from about $1 \times 10^{12}$ to about $10^{16}$ for periods of time of from about 2 minutes to about 200 days. During irradiation, thermal neutron capture occurs with the incident neutron not impacting enough energy to the nucleus of the thulium to cause bond rupture between the thulium and the carrier, but neutron capture followed by $\gamma$-ray emission results in the nucleus receiving recoil energy as set forth below:

$$E_R = \frac{E_\gamma^2}{(1862M)}$$

where $E_R$ is the recoil energy in mev.,
$E_\gamma$ is the gamma ray energy in mev.,
M is the mass of the target atom in atomic mass units.

The chemical bond energies between the thulium and the carrier are approximately 1–5 ev. Recoil energies for $M=200$, $E_\gamma=2$ mev. and $M=20$, $E_\gamma=6.0$ mev. calculate to 11 ev. and 967 ev. respectively indicating that thermal neutron capture will break most chemical bonds when thulium 170 is formed in the neutron reactor.

After the initial radiation step, free thulium 170 breaks away from the compound or complex which acts as the initial target material and can be easily separated by chemical separation, electrolytic deposition, plating, gas chromatography, flame spraying, vapor deposition and the like, if thulium 170 is desired in its purified form.

The free thulium 170 can be recombined directly in the reactor in a continuous process with a second carrier which can be the same organic material used to combine with the thulium 169 and irradiation continued whereupon another neutron is added to the nucleus of each thulium 170 atom to produce thulium 171 again causing the recoil energy to break the bond between the thulium 171 produced and the carrier. The reaction in the nuclear reactor can be carried out continuously with free 170 thulium being produced and combined to form a second compound. The second compound is irradiated to continuously produce thulium 171 which can be drawn off from the reactor in a continuous process using known separation procedures as above described.

Alternatively, the thulium 170 can be produced and recombined out of the reactor and then reintroduced to be neutron activated at flux levels and time periods similar to those described above to form free thulium 171 which can be separated by the above-noted conventional separation techniques to produce highly purified thulium 171.

Preferably the time between formation of thulium 170 and recombination with a stable carrier to form a stable carrier-thulium 170 compound is as short as possible since the thulium 170 continuously decays as a function of its half life which is 127 days according to the following relationship:

$N(t) = N_0 e^{-\lambda t}$,
$N_0$ = number of original Tm 170 atoms,
$N(t)$ = number of atoms remaining at any time, $t$ in days when
$\lambda = .693/T_{1/2}$ or $0.693/(127 \text{ days})$.

In a specific example illustrating forming a stable thulium compound of the present invention, the 8-hydroxyquinoline chelate of thulium 169 can be prepared as follows:

(1) Dissolve about 1.0 gram $Tm_2O_3$ in 30 cc. concentrated nitric acid by fuming slowly to dryness. Add another 30 cc. portion of $HNO_3$ and evaporate slowly to dryness. This forms hydrated thulium nitrate.

(2) Dissolve the $Tm(NO_2)_3 6H_2O$ in 30 to 40 cc. of distilled water.

(3) Heat the solution almost to boiling and add 8 cc. of 2 N acetic acid and an excess of a 3% alcoholic (methanol) solution of 8-hydroxyquinoline.

(4) Add dropwise a 10% aqueous solution of ammonium hydroxide until the solution smells strongly of ammonia.

(5) Digest the solution at about 65° C. for five minutes and allow to stand about one hour before filtering.

(6) Filter through a Büchner funnel washing with methanol and then water.

(7) Transfer the chelate to a weighing bottle or evaporating disk and dry in the dissicator.

Similar procedures can be used to prepare other stable compounds of thulium useful in the present invention.

While specific examples of the invention have been described many variations are possible. For example, the flux levels and times used can vary greatly so long as separation of free thulium 170 and thulium 171 is accomplished. The two-step irradiation and separation method of this invention can be used to obtain purified isotopes of any material which captures a first neutron to form one isotope which in turn can capture a second neutron to form a second isotope.

This invention is to be limited only by the spirit and scope of the following claims.

What is claimed is:

1. A method of purifying a radioactive isotope of a material which can be neutron activated to a first isotope which in turn can be neutron activated to a second isotope,
said method comprising combining said material with a first organic target atom carrying agent to form a first stable organic compound,
irradiating said compound in a nuclear reactor to form said first isotope and allowing recoil energy in the compound after irradiation to free said first isotope from said carrying agent,
combining said first isotope with a second organic target atom carrying agent to form a second organic compound and irradiating said second compound to form said second isotope and again allowing recoil energy in the compound to free said second isotope such that it can be easily separated in substantially free form,
whereby said target atom carrying agents are capable of being chemically joined with desired target atoms in such a way so as not to scavenge activated atoms to fill vacated sites nor thermally exchange target atoms with activated atoms, said carrying agents being resistant to damage by ionizing radiation, being resistant to decomposition at reactor operating temperatures, and having bond energies with the target atoms of between 1 ev. and 10 ev.

2. A method of purifying thulium isotopes comprising, chemically combining thulium 169 with a first target atom carrying agent to produce a stable thulium compound useful as a target material,
irradiating said compound in a nuclear reactor for a period of time at a neutron flux level high enough to form thulium 170 in said compound, and allowing the recoil energy in the compound after irradiation to break the bond between the thulium 170 and the carrying agent whereby thulium 170 is freed from said compound and accordingly from unreacted thulium 169,
combining said thulium 170 obtained from said irradiation step with a second target atom carrying agent to form a second stable compound,
irradiating said second compound for a period of time at a neutron flux level high enough to form thulium 171 in said compound and allowing the recoil energy in the compound to break the bond between the thulium 171 and the carrying agent whereby thulium 171 is free from said compound and accordingly from unreacted thulium 170, and
separating said thulium 171 from said second compound and decay products thereof, whereby said target atom carrying agents are capable of being chemically joined with desired target atoms in such a way so as not to scavenge activated atoms to fill vacated sites nor thermally exchange target atoms with activated atoms, said carrying agents being resistant to damage by ionizing radiation, being resistant to decomposition at reactor operating temperatures, and having bond energies with the target atoms of between 1 ev. and 10 ev.

3. A method in accordance with the method of claim 2 wherein said first and second carrying agents are selected from the group consisting of 2,2,6,6-tetramethyl-3,5 - heptanedione, 8 - hydroxyquinoline, phthalocyanine complexes and montmorillonite clays.

4. A method in accordance with the method of claim 2 wherein said steps of combining thulium 169 and thulium 170 with a carrying agent is carried out by reacting each thulium isotope with 8-hydroxyquinoline.

5. A method in accordance with the method of claim 2 wherein said step of combining thulium 170 with the second carrying agent is carried out in said nuclear reactor and said method is continuous.

6. A method in accordance with the method of claim 5 wherein thulium 171 is continuously withdrawn from said nuclear reactor during irradiation.

References Cited

UNITED STATES PATENTS

| | | | |
|---|---|---|---|
| 2,161,985 | 6/1939 | Szilard | 176—11 |
| 3,167,479 | 1/1965 | Feng | 176—16 |

OTHER REFERENCES

AEC document, ORNL–3792, May 1965, pp. 6–10, 17, 18, 24, 25, 45.

AEC document, DP–1066, vol. 1, May 1966, pp. I–14, I–62, I–67, I–68.

"Nuclear Chemistry and Its Applications," 1964, pp. 487–492.

"Chemistry and Industry," May 18, 1957, pp. 606–612, by Millar.

Ann. Review of Nuclear Science, vol. 7, 1957, by Kraus et al., pp. 31–41.

Nuclear Science Abstracts, vol. 15, No. 9, May 1961, p. 1408, abstract number 10,997.

BENJAMIN R. PADGETT, *Primary Examiner.*

H. E. BEHREND, *Assistant Examiner.*